Sept. 24, 1968     B. B. CORSON ET AL     3,403,170
PROCESS FOR THE PREPARATION OF HEXAHYDROPHTHALIC
ACID AND ANHYDRIDE
Filed May 9, 1966

INVENTORS
BEN B. CORSON &
WILLIAM T. GORMLEY

United States Patent Office 3,403,170
Patented Sept. 24, 1968

3,403,170
PROCESS FOR THE PREPARATION OF HEXAHYDROPHTHALIC ACID AND ANHYDRIDE
Ben B. Corson and William T. Gormley, Pittsburgh, Pa., assignors to Koppers Company, Inc., a corporation of Delaware
Filed May 9, 1966, Ser. No. 548,533
11 Claims. (Cl. 260—346.3)

ABSTRACT OF THE DISCLOSURE

A process is provided for the preparation of cis- and trans-hexahydrophthalic acids and cis-hexahydrophthalic anhydride directly from phthalic anhyride by forming an aqueous solution of a tertiary amine salt of phthalic anhydride, hydrogenating the tertiary amine salt, and heating the salt to remove the tertiary amine. To produce the cis-anhydride, the solution is heated to dryness and the anhydride distilled. For production of cis- and trans-hexahydrophthalic acid, phthalic anhydride is added to the aqueous solution causing the hexahydro derivatives to precipitate. These are readily separated and converted to the cis-anhydride.

---

Figure 2:
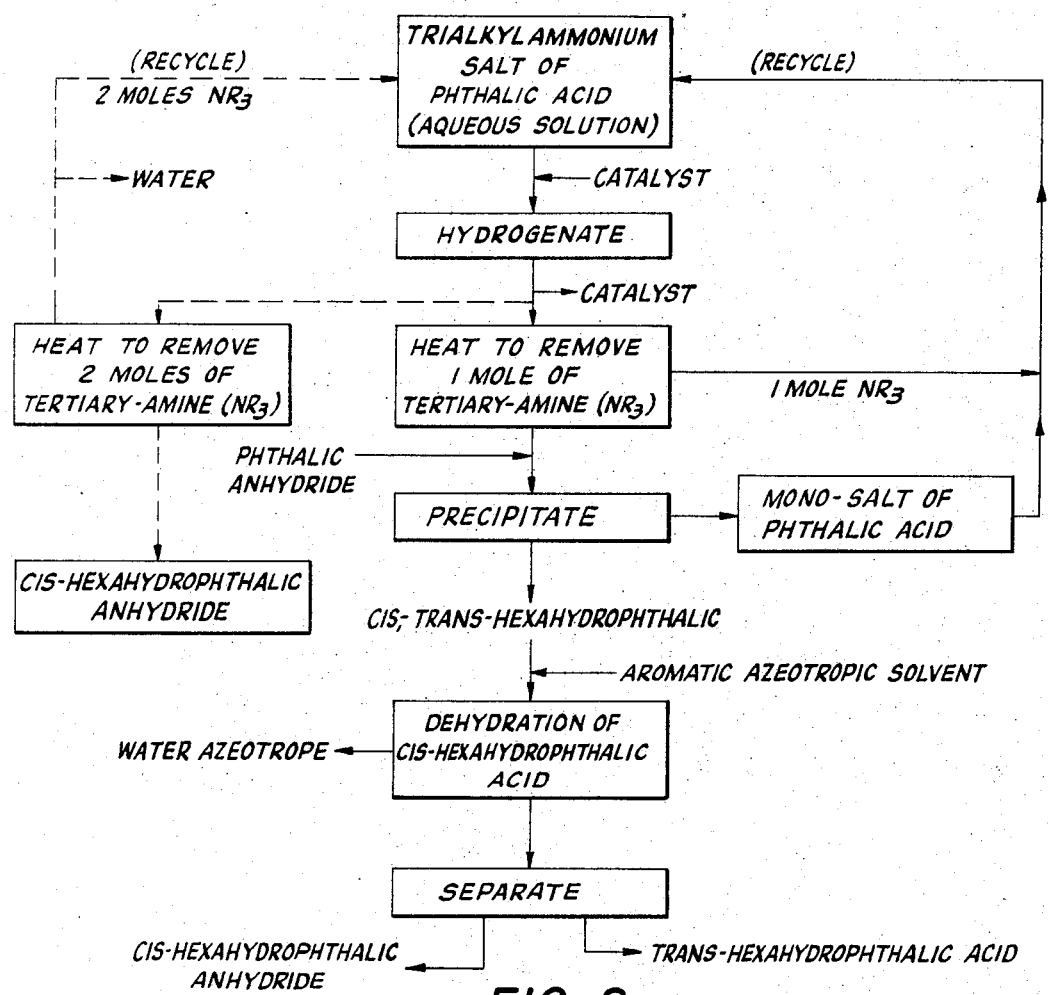

This invention relates to the preparation of hexahydrophthalic acid in the form of its cis- and trans-isomers, and to the production of cis-hexahydrophthalic anhydride. More specifically, it relates to a process for the preparation of cis- and trans-hexahydrophthalic acids and cis-hexahydrophthalic anhydride employing phthalic anhydride as starting material.

Hexahydrophthalic acids and hexahydrophthalic anhydride are useful in the manufacture of polymers, such as epoxides, polyesters and alkyd resins.

The production of hexahydrophthalic acid by hydrogenation of the metal salt of phthalic acid has been described in Schwenk et al. Patent No. 1,877,991. The process is inefficient and costly, however, in that the hydrogenated acid must be liberated from its metal salt by double decomposition with a mineral acid, thus degrading both the initial base (e.g., sodium hydroxide) and the mineral acid (e.g., sulfuric acid) to by-product sodium sulfate.

It has now been found that hexahydrophthalic acids and cis-hexahydrophthalic anhydride can be prepared in substantially quantitative yields by forming a tertiary amide salt of the phthalic acid containing at least one mole of tertiary amine, then hydrogenating said tertiary amine salt in the presence of a hydrogenation catalyst and removing the tertiary amine from the hydrogenated salt for reuse in forming additional tertiary amine salt of phthalic acid. The hydrogenated acid is liberated by phthalic anhydride and the (volatile) base is recycled.

In accordance with our invention, cis- and trans-hexahydrophthalic acids can be produced from a dibasic salt of phthalic acid, said salt containing at least one equivalent of a tertiary amine, by contacting an aqueous solution of such dibasic salt of phthalic acid with hydrogen in the presence of a catalyst to produce the dibasic salt of hexahydrophthalic acid, heating said aqueous solution of hexahydrophthalic acid to deaminate said dibasic salt, so that one mole of tertiary amine is driven off per mole of salt (the tertiary amine being used to basify additional mono salt of phthalic acid for future processing) leaving an aqueous solution of mono basic salt of hexahydrophthalic acid, and subsequently adding phthalic anhydride to this aqueous solution whereby a mixture of cis- and trans-hexahydrophthalic acids is precipitated, the residual aqueous solution of mono basic salt of phthalic acid is then recycled. The process is illustrated by the following equation, where R is a lower alkyl group and X is an alkali metal or $NR_3H$:

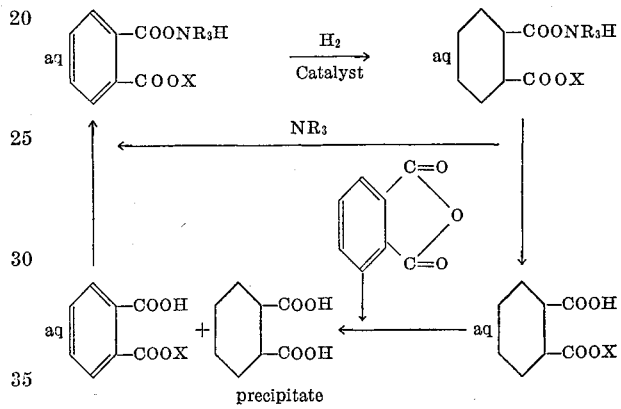

In the direct production of the cis-anhydride of hexahydrophthalic acid, the process requires the use of a di-(trialkylammonium) salt of phthalic acid and the process is modified whereby two tertiary amine groups are removed from the hydrogenated product to yield cis-hexahydrophthalic anhydride, and the expelled two moles of tertiary amine used to basify a fresh batch of phthalic acid for recycle. This process is illustrated by the following equation, where R is a lower alkyl group:

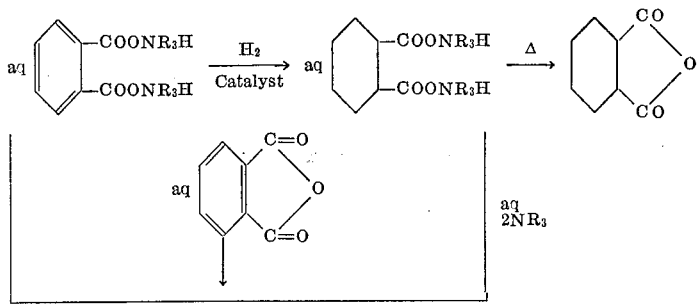

In our process, it is necessary that the dibasic salt of phthalic acid employed contain at least one equivalent of a tertiary amine. An example of such dibasic salt would be (triethylammonium) (sodium) phthalate or other (trialkylammonium) (alkali metal) mixed salts of phthalic acid which are water soluble. In the preferred method we use di-(trialkylammonium) phthalate. These salts or tertiary amine adducts are readily prepared from phthalic anhydride by neutralizing an aqueous suspension of phthalic anhydride with the desired base. The di-(trialkylammonium) phthalate is formed from an aqueous suspension of phthalic anhydride by the addition of sufficient tertiary amine to basify the aqueous solution. A (trialkylammonium) (alkali metal) phthalate is readily produced by adding to an aqueous suspension of phthalic anhydride one equivalent of an alkali metal base, to form the monobasic alkali metal phthalate, and then adding sufficient tertiary amine to this monobasic salt to form a (trialkylammonium) (alkali metal) phthalate. These mixed salts are also prepared equally well by the inverse order of addition of alkali metal base and tertiary amine. It is necessary, however, that at least one of the carboxyl groups of the phthalic acid is neutralized by the addition of a tertiary amine, thereby providing for subsequent removal of a tertiary amine in the deamination step.

Only tertiary amines can be used in the process of this invention. Trimethylamine and triethylamine are economical for commercial operations but other tertiary amines are useable. Under atmospheric conditions, triethylamine is preferred because of its boiling point (89.4° C. at 760 millimeters), which enables easy handling, and its relative solubility in water. Trimethylamine (boiling point 3.5° C.) may be used with the necessary changes in operation dictated by the properties of the trimethylamine. Ammonia, primary amines and secondary amines cannot be used in our process as they cause solution and deactivation of the nickel catalyst employed in the hydrogenation step through the formation of complexes.

The hydrogenation of the dibasic salt of phthalic acid is readily accomplished employing an aqueous solution and a nickel catalyst. The use of water as the solvent in our process not only provides the cheapest possible solvent, but also prevents the formation of phthalide or other by-products which normally form on hydrogenation of phthalic anhydride in organic solvents.

The catalyst employed in the hydrogenation is a relatively inexpensive non-noble metal hydrogenation catalyst. We have preferably used a nickel-kieselguhr catalyst. The preparation of a suitable catalyst is reported by Ipatieff and Corson in Industrial and Engineering Chemistry, volume 30, page 1039 (1938). This commercially available catalyst can, however, be replaced by other nickel catalysts made with different supports and nickel/support ratios, or by cobalt catalysts. Our process is, however, not limited to these hydrogenation catalysts and it is possible to use noble metal catalysts e.g., those containing platinum, palladium, or the like, in the hydrogenation step.

The dibasic salt of phthalic acid, in the form of an aqueous solution, is contacted with gaseous hydrogen at a temperature of between 100 and 250° C., preferably about 175° C., until hydrogen is no longer absorbed by the system. The pressure employed in the hydrogenation step may of course be varied. We prefer to use pressures of about 1000 p.s.i.g.

A unique characteristic of our present process lies in the fact that the aqueous solution formed at the beginning of our process is carried through the subsequent steps until the desired product is obtained. Following the hydrogenation of the aqueous solution of dibasic salt of phthalic acid to the hexadydrosalt, the reaction mixture need only be filtered to remove the hydrogenation catalyst and the aqueous solution of dibasic salt of hexahydrophthalic acid is ready for the subsequent steps in our process.

The second step in our process involves the deamination of the dibasic salt of hexahydrophthalic acid. Deamination, as employed in this specification, defines the removal of one or more equivalents of tertiary amine from a trialkylammonium salt or adduct of a carboxylic acid. Our process employs an aqueous solution, with the amine being removed from the aqueous solution, and the resulting carboxylic acid remaining in the aqueous solution.

It is surprising to note that the thermal deamination of di-(triethylammonium) hexahydrophthalate in aqueous solution can be readily controlled to remove exactly one mole of triethylamine per mole of di-(triethylammonium hexahydrophthalate. The deamination is carried out by boiling an aqueous solution of the salt while keeping the concentration of the solution constant by the addition of sufficient water saturated with triethylamine. The rate of deamination increases somewhat with increase in the concentration of salt in the aqueous solution, and decreases after elimination of one mole of triethylamine per mole of salt, when a di-(trialkylammonium) hexahydrophthalate is deaminated.

When a mixed salt of hexahydrophthalic acid is deaminated, the rate of elimination of the tertiary amine group from the salt is somewhat slower than the rate of deamination of di-(trialkylammonium) hexahydrophthalate. In such a case, we prefer to operate at reduced pressure, evaporating the aqueous solution to dryness and subsequently heating the dry residue to drive off the last of the tertiary amine to leave a residue of mono alkali salt of hexahydrophthalic acid.

Figure 1:
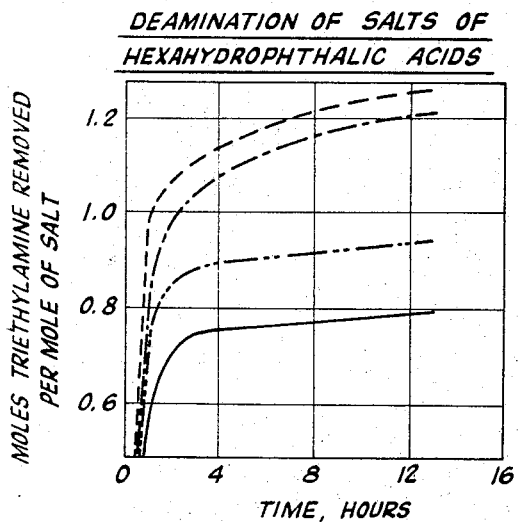

The rate of mono-deamination of di-(triethylammonium) hexahydrophthalate at atmospheric pressure is shown in FIG. 1, illustrating the sharp reduction in the deamination rate after one mole of triethylamine per mole of salt has been removed. FIG. 1 shows the various deamination rates of the cis- and trans-isomers of the di-(triethylammonium) hexahydrophthalates and also the rates of deamination of (triethylammonium) (sodium) hexahydrophthalate, rates again being given for both the cis- and trans-isomers. As seen from FIG. 1, when employing a 1.2 molal concentration, the removal of the second mole of triethylamine from di-(thiethylammonium) hexahydrophthalate occurs at a much slower rate, about $\frac{1}{50}$ as fast as the rate of removal of the first mole of triethylamine from the salt.

The temperature employed in the deamination step can be varied and is dependent upon the tertiary amine present and the pressure employed during the deamination step. The pressure employed is preferably atmospheric pressure, when using di-(triethylammonium) hexahydrophthalate, but would vary if some other tertiary amine were used in the process so as to correspond with the properties of the tertiary amine.

The concentration of the aqueous solution of hexahydrophthalate salt is a factor in the rate of deamination. As shown in the following table, the rate of mono-deamination of di-(triethylammonium) hexahydrophthalate increases as the concentration of the aqueous solution increases, the volume of each of the salt concentrations shown in the table being kept constant by the gradual addition of triethylamine-saturated water. As stated previously, the rate of removal of tertiary amine drops markedly after the removal of one mole of triethylamine per mole of salt.

TABLE I.—MONO-DEAMINATION AT ATMOSPHERIC PRESSURE OF DI-(TRIETHYLAMMONIUM) HEXAHYDROPHTHALATE

| Molal concentration on salt | Moles of NEt$_3$ removed per mole of salt | | |
|---|---|---|---|
| | 1 hour | 2 hours | 3 hours |
| | (Cis-isomer) | | |
| 0.43 | 0.93 | 1.01 | 1.04 |
| 0.74 | 0.95 | 1.02 | 1.06 |
| 1.20 | 1.01 | 1.08 | 1.11 |
| | (Trans-isomer) | | |
| 0.43 | 0.57 | 0.72 | 0.81 |
| 0.74 | 0.67 | 0.82 | 0.90 |
| 1.20 | 0.81 | 0.99 | 1.05 |

In the deamination of a mixed salt, e.g., (triethylammonium) (sodium) hexahydrophthalate, the tertiary amine may be expelled at the normal boiling point of the aqueous solution, but the rate of deamination is slower than that of the di-(triethylammonium) salt. Preferably, in the case of the mixed salt, a reduced pressure is used to evaporate the aqueous solution to dryness and the dry residue is heated at about 100° C. until one mole of tertiary amine has been removed from the salt.

For the direct formation of cis-hexahydrophthalic anhydride, the di-(trialkylammonium) salt of hexahydrophthalic acid is preferably used. Its aqueous solution is concentrated to dryness, which removes part of the tertiary amine, and the resulting anhydrous residue is further heated (preferably at reduced pressure) to expel the remaining tertiary amine and produce cis-hexahydrophthalic anhydride.

If the mixed salt is employed, the operation differs only in that cis-hexahydrophthalic anhydride is distilled away from the solid residue, which is the di-alkali metal salt of trans-hexahydrophthalic acid, from which trans-hexahydrophthalic acid can be precipitated by adding phthalic anhydride to its aqueous solution.

Upon mono-deamination of the dibasic salt of hexahydrophthalic acid there remains in the aqueous solution a mono salt of hexahydrophthalic acid, the particular salt dependent upon the starting material in the process. If a di-(trialkylammonium) phthalate is employed, the remaining aqueous solution would contain a mono-(trialkylammonium) salt of hexahydrophthalic acid, whereas if a mixed (trialkylammonium) (alkali metal) phthalate is used, an aqueous solution of a mono alkali salt of hexahydrophthalic acid would remain.

We have found that hexahydrophthalic acids can be precipitated from aqueous solution by the addition of phthalic anhydride to the solutions, followed by equilibration. The volume of the equilibrated mixture and the temperature of equilibration must be such that the mono salt of phthalic acid remains in solution while the hexahydrophthalic acids precipitate. Upon the addition of phthalic anhydride to the aqueous solution of hexahydrophthalic acids, a double decomposition takes place because of the greater acid strength of the phthalic acid. For example, with a mono-(trialkylammonium) salt of hexahydrophthalic acid:

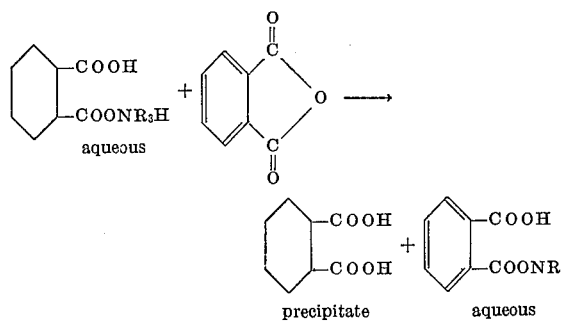

Precipitation of the hexahydrophthalic acid occurs because of the lower solubility of the hexahydro acid in water as compared with the solubility of the mono salt of phthalic acid.

The marked difference in solubility of the hexahydrophthalic acids and the mono salts of phthalic acid in water is shown in Table II:

TABLE II.—SOLUBILITY (G. COMPOUND/100 G. WATER)

| Temp., °C. | Hexahydro-acid | | Phthalic acid salts | |
|---|---|---|---|---|
| | Cis- | Trans- | Mono-sodium | Mono-(triethylammonium) |
| 0 | 0.24 | 0.10 | 7.40 | >7.0 |
| 25 | 0.43 | 0.27 | 14.0 | >14.0 |

The double decomposition reaction takes place because of the greater acid strength of phthalic acid as compared with hexahydrophthalic acid (pk 2.89 for the first acid hydrogen of the former versus pk 4.3 for the first acid hydrogen of the latter) and because of the relatively low solubility of hexahydrophthalic acid in water. It is this favorable solubility relationship which upsets the equilibrium between the relatively nonionized hexahydro acid and the ionized phthalate salt such that the former is precipitated and the latter remains in solution.

The precipitated hexahydrophthalic acids may be separated from the aqueous solution by various known means, such as filtration, centrifuging, and the like. In order to obtain the individual isomers of hexahydrophthalic acid, we have found that the cis-hexahydrophthalic acid can be converted quantitatively to cis-hexahydrophthalic anhydride under conditions in which trans-hexahydrophthalic acid remains unchanged. The separation of the cis- and trans-hexahydrophthalic acid mixture, with conversion of the cis-acid to anhydride, is significant because the separate products can be obtained in a pure state and are suitable as pure chemical products, which are more valuable separately than in admixture.

We have found that the conversion of cis-hexahydrophthalic acid present in mixtures of the cis- and trans-hexahydrophthalic acids can be accomplished by heating the acid mixture in a refluxing azeotropic medium. Dehydration occurs, the extent of which is indicated by the amount of water removed by the azeotrope. Aromatic hydrocarbons are suitable as azeotropic agents, the resulting cis-hexahydrophthalic anhydride being miscible therein, while the trans-hexahydrophthalic acid is insoluble.

We have found that preferably a 50–50 xylene-diethylbenzene mixture is used as an azeotropic agent. The reflux temperature of this mixture is about 155° C. Xylene alone can be employed but the rate of dehydration in xylene is only one-third as fast as the rate of dehydration in a 50–50 xylene-diethylbenzene mixture. If diethylbenzene alone is used as the azeotropic solvent, boiling point about 180° C., the considerable rapidity of the dehydration causes excessive frothing of the reaction mixture. Other solvents of course can be used dependent upon their solubility characteristics and reflux temperatures.

After the theoretical amount of water has been removed by the azeotropic agent, the resulting slurry is filtered, or separation may be accomplished by other suitable means, and the solid which is recovered comprises the trans-hexahydrophthalic acid present in the starting mixture. The organic filtrate then need only be concentrated to yield cis-hexahydrophthalic anhydride, formed from the cis-hexahydrophthalic acid present in the original mixture. This anhydride can be rehydrated to give the cis-hexahydrophthalic acid, if desired.

If cis-hexahydrophthalic anhydride is desired, it may be prepared, as previously stated, by the dehydration of cis-hexahydrophthalic acid in the mixtures formed upon springing of the mono salts of hexahydrophthalic acid from the aqueous solution of our process. Or, cis-hexahydrophthalic anhydride can be formed directly by our process. For example, the aqueous solution of di-(trialkylammonium) hexahydrophthalate, produced by the hydrogenation of di-(trialkylammonium) phthalate, is concentrated to remove water and part of the tertiary amine, and the resulting anhydrous solid is heated up to 200–250° C., preferably under subatmospheric pressure, to expel residual tertiary amine, leaving cis-hexahydrophthalic anhydride as residue. We have found that essentially quantitative yields of cis-hexahydrophthalic anhydride can be thus obtained, starting from phthalic anhydride.

Cis-hexahydrophthalic anhydride is also prepared by hydrogenating mixed salts of phthalic acid (e.g., sodium triethylammonium phthalate) in aqueous solution, evaporating the solution to dryness, which removes part of the tertiary amine, and further heating the residual salt at reduced pressure, which expels the rest of the tertiary amine. Finally, the heating is continued up to 200–350° C. at reduced pressure which results in a disproportionation reaction which produces cis-hexahydrophthalic anhydride (which distills off) from the mono-alkali metal salts or both cis- and trans-hexahydrophthalic acids with co-product formation of the di-alkali metal salt. The di-alkali salt is dissolved in water and phthalic anhydride is added to the solution to precipitate trans-hexahydrophthalic acid. The trans-acid is filtered off, and the filtrate, containing mono-alkali salt of phthalic acid, is basified with previously removed tertiary amine and recycled.

There is thus provided a process based on phthalic anhydride for the preparation of the following optional products: a cis-trans-mixture of hexahydrophthalic acids, or the separate cis- and trans-hexahydro acids, or of cis-hexahydrophthalic anhydride. With the employment of the aqueous solutions of our process, hydrogenation is readily effected without preparation of by-products and the aqueous solution may be carried throughout the process, thereby eliminating various separation or purification steps inherent in many chemical processes. The invention is schematically illustrated in FIG. 2 by flow diagram. The invention is further illustrated by the following examples:

Example I

To form the diammonium salt, an aqueous solution of di-(triethylammonium) phthalate (pH 10.3) was prepared by basifying a mixture of 7.41 grams (0.05 mole) of phthalic anhydride and 50 milliliters of water with 11.1 grams (0.11 mole, 10% excess) of triethylamine. To hydrogenate the diammonium salt, this aqueous solution was hydrogenated for seven hours in a stirred autoclave at 175° C. and 1000 p.s.i.g., in the presence of four grams of nickel-kieselguhr catalyst. After the autoclave had cooled and the hydrogen had been bled off, the aqueous solution was filtered to separate the catalyst. For the deamination or removal of one mole of the tertiary amine, the aqueous filtrate containing di-(triethylammonium) hexahydrophthalate was boiled for two hours at atmospheric pressure, keeping the volume of the solution constant by the gradual addition of about 90 milliliters of triethylamine-saturated aqueous solution (1.5 weight percent concentration), and collecting the water-triethylamine distillate for subsequent recycling. To the stirred aqueous pot residue of mono-(triethylammonium) hexahydrophthalate was added 7.41 grams (0.05 mole) of phthalic anhydride. The mixture was maintained at 85° C. for an hour to obtain complete solution; then it was cooled slowly to 20° C. as the cis- and trans-hexahydrophthalic acids started to precipitate. After standing for twelve hours the mixture was filtered to give 8.0 grams (93% yield) of hexahydrophthalic acid of 99% purity (53% cis- and 47% trans-isomer). The aqueous filtrate, containing mono-(triethylammonium) phthalate, was basified with the recovered triethylamine (deamination distillate) and the above hydrogenation-deamination-precipitation cycle repeated.

Example II

An aqueous solution of sodium triethylammonium phthalate (pH 10.5) was prepared by basifying a mixture of 7.41 grams (0.05 mole) of phthalic anhydride and 75 milliliters of water with 2.0 grams (0.05 mole) of sodium hydroxide followed by 5.56 grams (0.055 mole, 10% excess) of triethylamine. The aqueous solution was hydrogenated for seven hours at 175° C. and 1000 p.s.i.g. in the presence of four grams of nickel-kieselguhr catalyst. After cooling the autoclave and removing the excess hydrogen, the aqueous solution was removed and filtered. The filtrate was heated at 100° C./25 mm. for a period of two hours (the water-triethylamine distillate being collected for recycling) to deaminate the salt. To the solid residue of mono-sodium hexahydrophthalate were added 75 ml. of water and 7.41 grams (0.05 mole) of phthalic anhydride, and the stirred mixture was heated at 100° C. for one hour to obtain complete solution and then cooled slowly to 20° C. After standing, the slurry was filtered to give as solids 7.9 grams (92% yield) of hexahydrophthalic acid of 99% purity (50% cis- and 50% trans-isomer). The aqueous filtrate containing mono-sodium phthalate was basified with the recovered triethylamine (deamination distillate) and the above hydrogenation-deamination-precipitation cycle repeated.

Example III

An aqueous solution of (sodium) (triethylammonium) phthalate (pH 10.5) was prepared by basifying a mixture of 7.41 grams (0.050 mole) of phthalic anhydride and 75 ml. of water with 2.0 grams (0.050 mole) of sodium hydroxide folowed by 5.56 grams (0.055 mole, 10% excess) of triethylamine. The solution was hydrogenated in an autoclave for seven hours at 175° C. under 1000 p.s.i.g. of hydrogen in the presence of 4 grams of nickel catalyst. The autoclave was cooled, the hydrogen bled off and the aqueous solution filtered to remove the catalyst. The filtrate was heated at 100° C./25 mm. mercury pressure for two hours to mono-deaminate the hexahydrophthalic acid salts, the water-triethylamine distillate being collected for recycling. The solid residue of mono-sodium hexahydrophthalate was heated for three hours at 320° C./25 mm. mercury pressure in a slow stream of nitrogen to yield a distillate of 3.78 grams (98%) of cis-hexahydrophthalic anhydride. To the residual di-sodium hexahydrophthalate were added 67 ml. of water and 7.41 grams (0.050 mole) of phthalic anhydride. This slurry was heated to 100° C. to obtain complete solution, then cooled to 25° C., allowed to stand overnight and filtered to yield 3.97 grams (92%) of 90% trans-hexahydrophthalic acid. The aqueous containing mono-sodium phthalate was basified with recovered triethylamine, and the above cycle repeated.

Example IV

An aqueous solution of di(triethylammonium) phthalate was hydrogenated as in Example I. The aqueous catalyzate was filtered to remove catalyst and the filtrate, containing di-(triethylammonium) hexahydrophthalate, was concentrated to remove water and part of the tertiary amine. The residue was heated at 200–220° C./25 mm. for a period of four hours to expel the remainder of the tertiary amine and leave a solid residue of cis-hexahydrophthalic anhydride containing a minor amount of hexahydrophthalic acid. The recovered tertiary amine was used to basify another batch of phthalic anhydride and the process repeated. The cis-hexahydrophthalic anhydride was removed from the residue by extraction with benzene, the minor amount of hexahydrophthalic acid remaining as residue.

Example V

To a mixture of 17.2 grams of cis- and trans-hexahydrophthalic acids which had been prepared as in Example II (containing 0.05 mole of each isomer) was added 100 ml. of a 50–50 xylene-diethylbenzene mixture. The resulting slurry was stirred and refluxed for one hour using a Dean-Stark water trap to remove the water (0.9 gram, 0.05 mole). The slurry was then cooled to room temperature and filtered to yield 8.50 grams (99% of theory) of trans-hexahydrophthalic acid, identified by melting point (227–229° C.) and mixture melting point with an authentic specimen. The solvent was removed from the filtrate by distillation and the 7.60 grams (99% of theory) of residue was identified as cis-hexahydrophthalic anhydride by its infra-red spectrum.

Example VI

To 27.34 grams (0.10 mole) of trans-mono-triethylammonium hexahydrophthalate was added 100 milliliters of water and to the mixture was added 14.81 grams (0.10 mole) of phthalic anhydride. The resulting slurry was stirred at 75° C. for two hours, then cooled to 25° C. After standing overnight at 25° C. the mixture was filtered to yield 16.29 grams of solid which was shown by spectrometric examination to be trans-hexahydrophthalic acid of 99% purity. The yield was 94%. The aqueous filtrate theoretically contained 16.45 grams of phthalic acid (corresponding to 99% of the acid equivalent of 14.81 grams of phthalic anhydride) in the form of its monotriethylammonium salt, plus 1.07 grams of trans-hexahydrophthalic acid. The values obtained by acidification, filtration and ether extraction of the filtrate, were 16.45 grams of phthalic acid and 0.96 gram of trans-hexahydrophthalic acid, in excellent correspondence with the theoretical values.

Example VII

To 27.34 grams (0.10 mole) of cis-mono-triethylammonium hexahydrophthalate was added 75 milliliters of water and to the mixture was added 14.81 grams (0.10 mole) of phthalic anhydride. The resulting slurry was stirred and heated (at about 100° C.) under a reflux condenser to obtain complete solution, then cooled slowly to 25° C. After storing overnight at 3° C., the mixture was filtered to give 15.76 grams of solid. Spectrometric examination showed the solid to be cis-hexahydrophthalic acid of 99% purity (91% yield).

Example VIII

To 19.41 grams (0.10 mole) of trans-mono-sodium hexahydrophthalate prepared as in Example II was added 175 milliliters of water to form a slurry. Then 14.81 grams (0.10 mole) of phthalic anhydride was added. The stirred slurry was heated under a reflux condenser to 100° C. to obtain complete solution, then cooled slowly to 25° C. After standing overnight at 25° C., the mixture was filtered to give 16.19 grams of solid whose infra-red spectrum showed it to be trans-hexahydrophthalic acid of 98% purity (92% yield).

The same procedure was employed using cis-monosodium hexahydrophthalate prepared as in Example II. There was obtained 15.59 grams of 99% pure cis-hexahydrophthalic acid (90% yield).

We claim:
1. Process for producing hexahydrophthalic acid by the hydrogenation of phthalic acid which comprises:
   neutralizing said phthalic acid by adding a base containing at least one mole of a tri(lower alkyl) amine per mole of phthalic acid to an aqueous solution of said phthalic acid to form a trialkylammonium salt thereof,
   hydrogenating said trialkylammonium salt of phthalic acid in the presence of a hydrogenation catalyst selected from the group consisting of nickel, cobalt and noble metal hydrogenation catalysts to produce hexahydro derivatives thereof, and
   removing said tri(lower alkyl) amine from said hexahydro derivatives for recycle of said amine to the first step of the process.
2. A process for producing hexahydrophthalic acid comprising:
   contacting an aqueous solution of dibasic salt of phthalic acid, said salt containing at least one mole of tri(lower alkyl) amine, with hydrogen in the presence of a catalyst selected from the group consisting of nickel, cobalt and noble metal hydrogenation catalysts to produce an aqueous solution of hexahydro derivatives thereof,
   heating said aqueous solution of hexahydro derivatives to remove one mole of tri(lower alkyl) amine per mole of hexahydro derivative, and
   adding a stoichiometric quantity of phthalic anhydride to the aqueous solution of said hexahydro derivatives whereby hexahydrophthalic acids are precipitated from said aqueous solution, and
   recovering said hexahydrophthalic acids therefrom.
3. The process of claim 2 in which said dibasic salt of phthalic acid is a di-(tri-loweralkylammonium) phthalate.
4. The process of claim 2 wherein said dibasic salt of phthalic acid is a mixed salt containing one mole of an alkali metal and one mole of a tri(lower alkyl) amine.
5. The process of claim 2 wherein said catalyst is a nickel containing catalyst.
6. The process of claim 2 wherein said mole of tri(lower alkyl) amine removed from said hexahydro derivatives is recycled to produce additional said dibasic salt of phthalic acid.
7. The process of claim 2 wherein said aqueous solution, following said recovering of hexahydrophthalic acids therefrom, is basified with a tri(lower alkyl) amine and reprocessed.
8. The process of claim 2 wherein said hexahydrophthalic acids are refluxed in a solution of aromatic solvents which dissolve cis-hexahydrophthalic anhydride and reflux at about 150–160° C. whereby one mole of water per mole of cis-hexahydrophthalic acid in said hexahydrophthalic acids is removed to convert said cis hexahydrophthalic acid to cis-hexahydrophthalic anhydride, said cis-hexahydrophthalic anhydride being dissolved in said solvents.
9. A process for preparing cis-hexahydrophthalic anhydride comprising:
   contacting an aqueous solution of di-(tri-loweralkylammonium) phthalate with hydrogen in the presence of of a catalyst selected from the group consisting of nickel, cobalt and noble metal hydrogenation catalysts to produce an aqueous solution of hexahydro derivatives thereof,
   separating said catalyst from said aqueous solution, and heating said hexahydro derivatives so that two moles of tri(lower alkyl) amine per mole of said hexahydro derivative are removed.
10. The process of claim 9 wherein said two moles of tri(lower alkyl) amine removed from said hexahydro derivatives are recycled to produce additional said di-(tri-loweralkylammonium) phthalate.
11. Process for producing cis-hexahydrophthalic anhydride comprising:
   contacting an aqueous solution of (alkali metal) (tri-loweralkylammonium) phthalate with hydrogen in the presence of a catalyst selected from the group consisting of nickel, cobalt and noble metal hydrogenation catalysts to produce an aqueous solution of a hexahydro derivative thereof,
   heating said aqueous solution of hexahydro derivative at sub-atmospheric pressure to remove water therefrom and deaminate said hexahydro derivative to leave a solid residue,
   heating said solid residue at sub-atmospheric pressure whereby cis-hexahydrophthalic anhydride is distilled therefrom.

References Cited

UNITED STATES PATENTS

| | | | |
|---|---|---|---|
| 1,877,991 | 9/1932 | Schwenk et al. | 260—514 |
| 2,664,440 | 12/1953 | Toland | 260—525 |
| 2,828,335 | 3/1958 | Ferstandig | 260—514 |
| 3,007,942 | 11/1961 | Burney | 260—346.7 |

OTHER REFERENCES

Baeyer, Liebig's Annalen, vol. 258, pp. 216–19, QD1L7.

Belcher et al., Chem. Abstracts, vol. 55 (1961), p. 4117, QD1AS1.

NICHOLAS S. RIZZO, *Primary Examiner.*

B. DENTZ, *Assistant Examiner.*